July 17, 1962
G. H. HOSKINSON
3,044,460
HEATER CONSTRUCTION
Filed Dec. 5, 1957
2 Sheets-Sheet 2
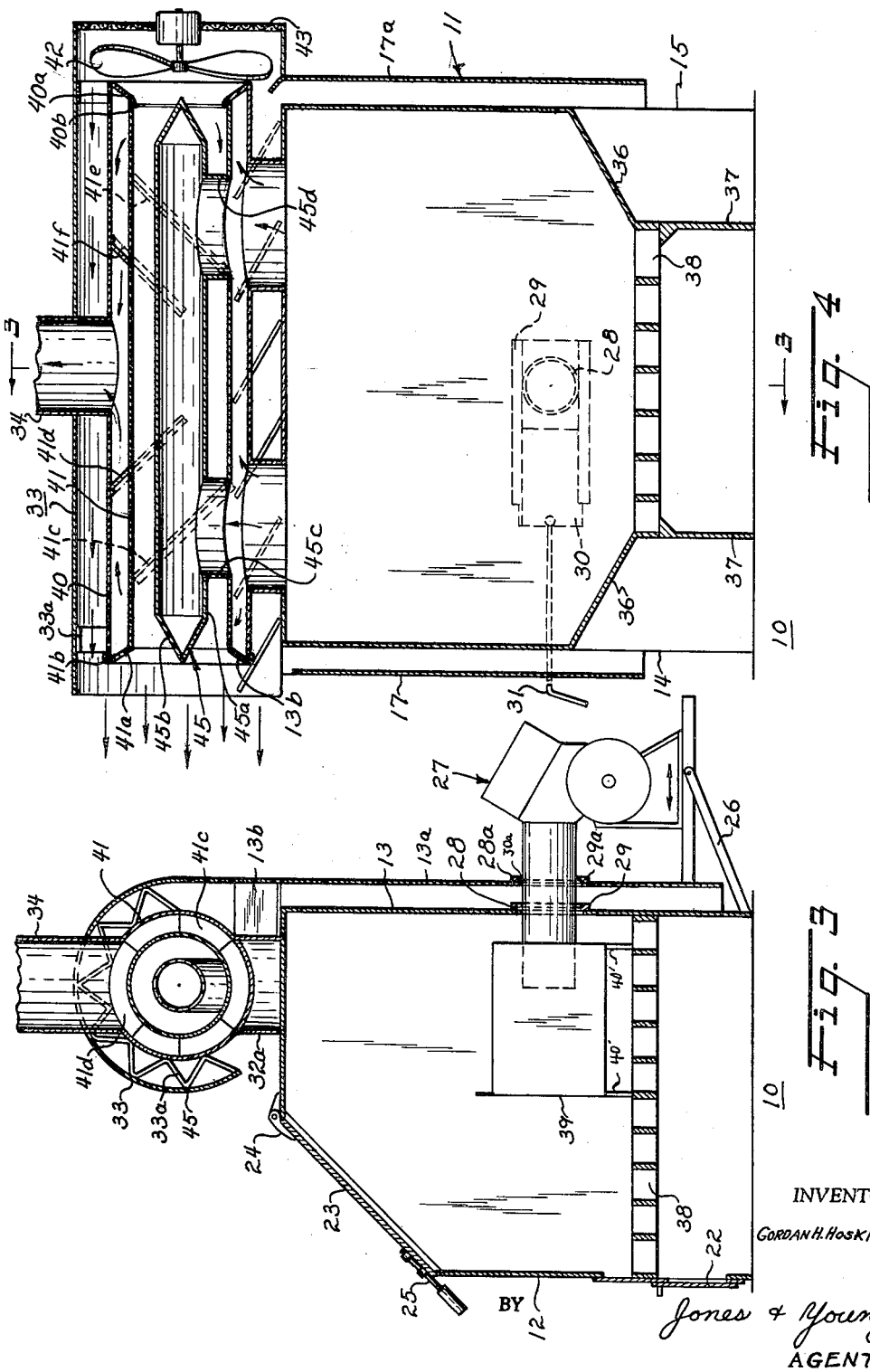
INVENTOR
GORDAN H. HOSKINSON,
BY Jones & Young
AGENTS

# 3,044,460
HEATER CONSTRUCTION
Gordon H. Hoskinson, 22101 Jamaica Ave.,
Queens Village, Long Island, N.Y.
Filed Dec. 5, 1957, Ser. No. 700,809
13 Claims. (Cl. 126—110)

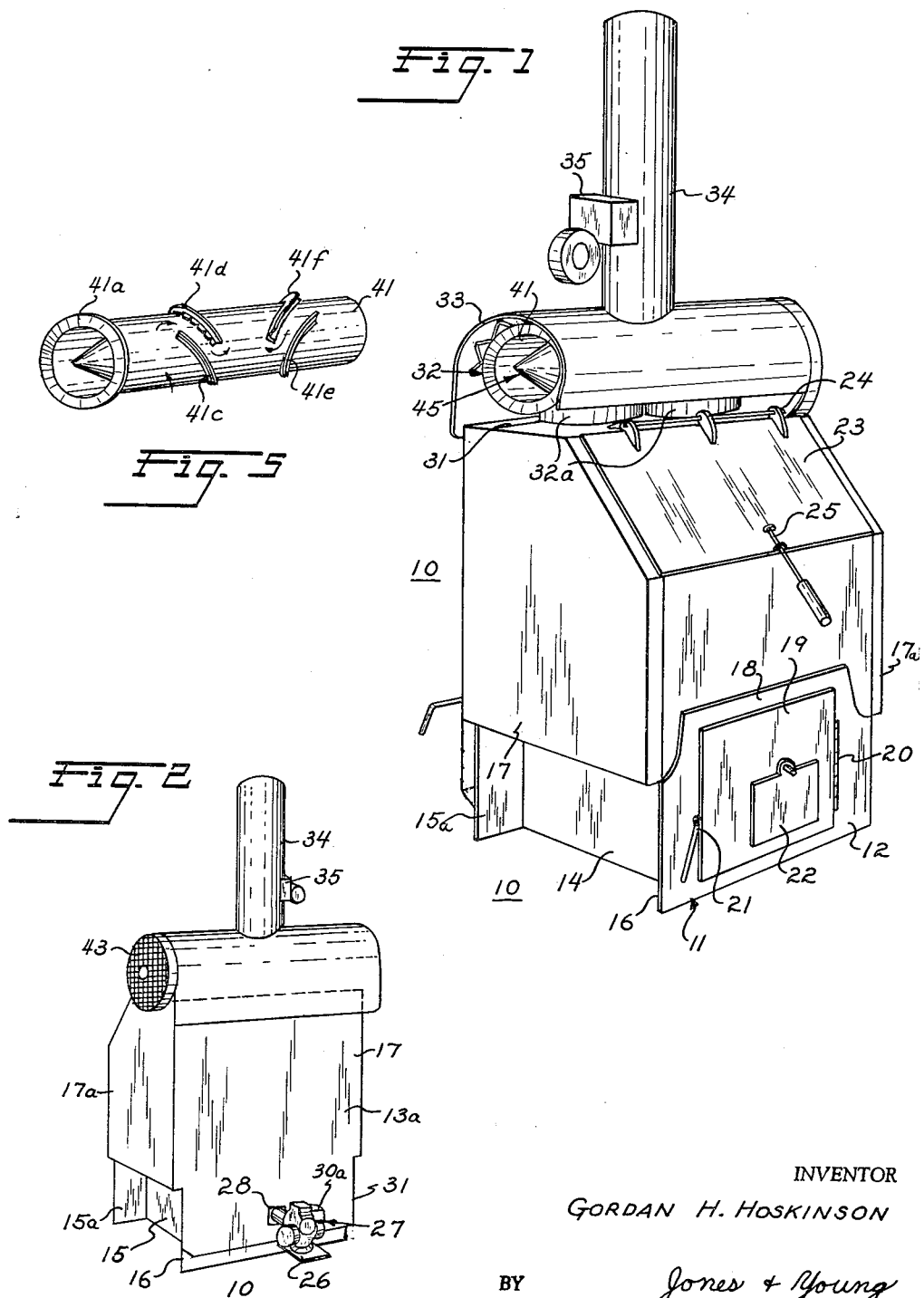

The present invention relates to heating apparatus, and more particularly to heating apparatus capable of serving a dual purpose of providing heat and disposing of waste, refuse and the like.

There has been a long need in small and large industrial plants as well as farms and the like for heating apparatus which not only can be employed as a heater but also can be used to dispose of waste, rubbish, and the like. Heretofore the heating plants in plants, buildings, and the like have been used solely for heating a given area with gas, oil, or coal being used as the fuel. To dispose of waste, rubbish, or similar material, the plants or the like have either used commercial rubbish burners to collect and dispose of their waste, or have had, if the rubbish is in a large enough volume, a separate incinerator located at some isolated point to burn the refuse. In other plants where the volume of waste is small, the material is usually placed in one spot and burned in the manner of a bonfire.

Each of these methods has economically undesirable features. First, the use of a commercial rubbish removal company is at a continuing cost and somewhat expensive. On the other hand, the purchase and installation of an incinerator is a large initial outlay of funds which will require a considerable length of time to amortize. Secondly, the use of an incinerator is uneconomical since considerable heat is generated which is never used. Further, open bonfire means to dispose of waste creates a serious fire hazard.

It is therefore a principal object in the elimination of the foregoing and related disadvantages to provide a heating plant which can serve both as a heating unit as well as a refuse disposal unit.

Another object of the present invention is the production of a heating plant that is extremely simple in design and construction and easily portable for use at various points.

Yet another object of the present invention is the provision of a heating unit that is convertible from a furnace proper to an incinerator proper in a matter of seconds.

Still another object of the present invention is the provision of a heating plant that can serve as an incinerator and at the same time be employed to give heat to any particular area.

Still another object of the present invention is the provision of a heating plant that is highly efficient in operation when used as an incinerator, thereby eliminating any unpleasant odors as well as properly burning the refuse.

Yet another object of the present invention is the provision of a heating plant that can be employed in small and large plants, homes, farms, and the like to provide heat as well as means for disposing of refuse in a cheap, inexpensive manner.

Still another object of the present invention is the provision of a heating plant that can be cleaned in a matter of a few moments regardless of whether it is used as a heating plant or as a refuse burner.

Other and additional objects will become manifest from the ensuing description taken in conjunction with the accompanying drawings.

Broadly stated, the heating apparatus made in accordance with the present invention comprises a casing defining a fire burning area, an opening in the front of said casing to provide access thereinto, spaced wall means on either side of said casing for passage of air upwardly therebetween, outlet means provided at the top of said casing, elongated housing means secured to said outlet means with each end of said housing means being open, exhaust means secured to the top of said housing means for carrying off smoke, heat, and the like, draft inducing means connected to said exhaust means, blower means positioned at one end of said housing means to blow air therethrough is substantially transverse relationship to the passage of heat, smoke, and the like coming from said casing.

To the accomplishment of the foregoing and related ends, the present invention then consists of the means hereinafter fully described and particularly pointed out in the claims, the annexed drawing and the following description setting forth in detail certain means in the carrying out of the invention, such disclosed means illustrating, however, but one of various ways in which the principle of the invention may be employed.

The present invention is illustrated, by way of example, in the accompanying drawings, in which:

FIGURE 1 is a front perspective view of a heating plant made in accordance with the present invention.

FIG. 2 is a rear perspective elevation of a heating plant made in accordance with the present invention.

FIG. 3 is a side elevation in cross-section of a heating plant made in accordance with the present invention illustrating the passage of smoke and the like from the fire area.

FIG. 4 is a front elevation of a heating plant made in accordance with the present invention illustrating the heat transfer aspects of the invention.

FIG. 5 is a perspective view of a portion of the heat exchanger housing made in accordance with the present invention removed from the unit, illustrating the flow path of the smoke.

Referring now to the drawings and with particular reference to FIGS. 1 and 2, an illustrative embodiment of a heating apparatus made in accordance with the present invention and generally designated by reference numeral 10 is shown. The heating apparatus 10 includes a metal main body housing 11 which functions as the fire area and comprises front and back wall members 12 and 13 and opposed side wall members 14 and 15. The front wall member 12 is of a height less than the back wall member 13 and the side wall members 14 and 15 to provide access to the housing in a manner to be more fully described hereinafter. The side wall members 14 and 15 are spaced inwardly from the respective free ends of the front and back wall members 12 and 13 and are secured thereto by welding, riveting, or the like. This construction results in vertically extending side portions 15a and 16 extending outwardly on each end of the body housing 11. Side cover members 17 and 17a are secured to the side portions 15a and 16 on each side of the housing in spaced relationship thereto at a point above the bottom end of the side portions 15a and 16 by means of welding, brazing, riveting, or the like. In connection with this, it is to be noted that the top edge of the cover member 17 stops short of the top edge of the side wall member 14 and is provided with a slight, outwardly flared lip. Similarly, the top edge of the cover member 17a extends above the top edge of the side wall member 15 and is provided with an inwardly flared lip portion. This construction defines a bottom entrance and a spaced passageway on either side of the housing 11 to enable air to be drawn in at the bottom of the body housing and to pass upwardly on either side thereof and be directed in a manner to facilitate heat transfer in a manner to be more fully described hereinafter.

The front wall member 12 is provided with a large rectangular opening at its bottom edge thereof through which ashes and the like will be removed. The opening is framed by a door plate frame 18 which is secured around the perimeter of the front wall member 12 by riveting, welding, or the like. The door frame member 18 is provided with a central rectangular opening which is covered by a door 19 which is hingedly secured thereto by means of a hinge construction 20 to provide access into the housing body 11 to remove ashes and the like therefrom. The opposite end of the door 19 is provided with a handle and latch mechanism 21 to enable the door to be retained in a closed state normally. The door 19 is provided with a draft door 22 centrally positioned adjacent its lower edge by any suitable means which is operable to provide any desired degree of draft for the housing body 11 during a burning operation therein.

The top transverse edge of the front wall member 12 terminates at a point below that of the back wall member 13 and the side wall members 14 and 15, as hereinbefore indicated. The front portions of the side wall members 14 and 15 lying above the front wall member 12 are inwardly inclined, defining a rectangular opening into the housing which lies in inclined relationship to the remainder of the body housing for feeding material to be burned thereinto. The inclined opening is covered by a large feed door 23 which is secured to the top edge of the housing body 11 by means of a rod and hinge construction 24. The lower end of the feed door 23 is provided with a latch and handle mechanism 25 to provide means to lock the feed door 23 in position and yet readily detachable to enable material to be fed into the body housing 11 for burning.

The back wall member 13 is provided with a back cover member 13a which is secured thereto in spaced relation along its side edges by means of side flange portions by welding, riveting, and the like. The bottom edge of the back cover member 13a is spaced above the bottom edge of the back wall member 13 to provide a vertical passageway for air in the same manner and for the same purpose as the side cover members 17.

The back cover member 13a is provided along its bottom edge with an outwardly extending rectangular frame member 26 which is adapted to receive, in this illustrative embodiment of the invention, a gun type oil burner generally designated by reference numeral 27. The burner 27 is positioned so as to be moveable back and forth along the frame member 26 so as to enable the burner 27 to be completely withdrawn from the housing body 11. The back wall member 13 and the cover member 13a are each provided with complementary circular openings 28 and 28a through which the gun portion of the burner 27 will pass into the fire burning area of the housing 11. The inside surface of the back wall member 13, and the outside surface of the end cover member 13a, as shown in FIG. 4, are each provided with spaced parallel slots 29 and 29a, respectively, which extend on opposed sides of the openings 28 and 28a. A cover plate 30 is slidably positioned within the spaced parallel slot portion 29 of the end wall member 13 and is adapted to be slid therebetween to cover the opening 28 upon actuation of the cover plate handle 31. Similarly, the spaced slot portions 29a is provided with a cover plate 30a which is manually operable to close the opening 29a upon withdrawal of the burner 27. This will enable the main body housing 11 to be completely enclosed when oil is not being used as the fuel. That is to say, withdrawing the oil burner 27 rearwardly on the frame 26 will result in a withdrawing of the burner gun from the openings 28 and 28a. Pushing the cover handle member 31 inwardly results in the cover plate 30 moving along the slots 29 to cover the opening 28. The manual operation of the cover plate 30a completely seals the unit.

The top cover member 31 of the body housing 11 is provided with a pair of circular openings into which outlet pipes 32a are positioned. The top free ends of the pipes 32a are secured to a transversely extending heat-exchange housing generally designated by reference numeral 32, through which the heat and smoke from the main body housing 11 will pass and be dissipated and carried off in a manner to be more fully described hereinafter. The transversely extending housing 32 is covered by a shield 33 which is secured at one end to the top end of the housing cover member 13a and is bent forwardly around the heat-exchange housing 32 in spaced relationship thereto and stopping short of the top portion 31 of the housing 11. The shield 33 is held in spaced relationship from the housing 32 by means of spacer strips 33a.

A flue member 34 is secured to the transverse heat-exchange housing 32 and extends upwardly through the casing 33 to carry off the smoke. The flue 34 is provided with a draft inducer blower 35 which consists of a small exhaust motor mounted on the flue proper to create a high draft on the main body housing 11 to insure a high efficiency of burning as well as to carry off any smoke generated thereby.

The construction just described generally designates the overall arrangement of an illustrative embodiment of the heating apparatus. It will be found advantageous to employ stainless steel in the construction of the main body housing 11 although it is to be clearly understood that any suitable metal of a gauge sufficient to satisfy the needed requirements may be employed. The ash door and the feed door 19 and the transversely extending housing 32 are preferably made of heavy gauge cast iron in order to insure sturdiness and long wear to the construction.

Referring now to FIGS. 3 and 4 wherein the internal construction of the illustrative embodiment of the heater construction made in accordance with the present invention is shown, the main body housing 11 is provided with inclined support portions 36 which are associated with a pair of vertical grate supporting legs 37. A grate member 38 is supported by the grate supporting legs 37 at a distance sufficiently high to enable ashes to be withdrawn through the ash collecting door 19. The supporting legs 37 are spaced from one another for a distance just slightly less than the width of the ash-receiving door 19 through which the grate 38 may be withdrawn or replaced. The grate 38 should lay in a position at a point below the opening 28 in the end wall member 13 in order that a firebox supported thereon will be efficiently positioned with respect to the oil burner 27.

As shown in FIG. 3, an oil burner 27, for purposes of illustration, is shown in operable position with oil to be used as the fuel. However, it is to be clearly understood that a gun type gas burner can be used equally as well and in the same manner as an oil burner. When the heating unit 10 is to be used as an oil burner or gas burner primarily for purposes of heating a given area, a firebox 39 is positioned on the grate 38 with the gun of the burner 27 entering thereinto. The firebox 39 may be made of any suitable material but preferably consists of a rectangular, stainless steel box provided with legs 40' which rest on the grate 38, with the firebox being in substantially vertical alignment with the discharge outlets 32a of the main body housing 11.

If the heating apparatus 10 is to be employed as an incinerator, or if coal or similar fuel is to be used as the heating medium, either hand fed or stoker fed, the firebox 39 and the burner 27 are not to be used in the main body housing 11 as shown in FIG. 4. In converting from oil or gas to an incinerator or coal burner, the firebox 39 is withdrawn from the main body housing 11 through the feed door 23 for storage until needed. The oil or gas burner 27 is rearwardly withdrawn on the support frame 26, drawing the gun portion of the burner completely out of the heating unit. Handle 31 is then pushed inwardly, resulting in the cover plate 30 sealing the opening 28. Similarly, the cover plate 30a is manually operated to close the opening 28a in the rear shield 13a.

The heat exchanger housing 32 comprises a central cylindrical outer shell body 40 of heavy gauge metal which is connected to the spaced outlet pipes 32a in transverse relationship with respect thereto. An inner central cylindrical shell body 41 similarly made of heavy gauge metal is detachably positioned within the outer shell body 40 in spaced relationship. This construction defines a tubular member having a central passageway extending therethrough. The association of the outer and inner shell bodies 40 and 41 result in an air-tight area between the two bodies with the exception of the two inlet openings in the outer shell body 40 to receive inlet pipes 32a and the outlet opening in the outer shell body 40 to receive the flue 34. The forward end of the inner shell body 41 is provided with an outwardly flaring rim portion 41a with the outward terminal end of the flared rim portion 41a provided with a reversely turned perimetral flange portion 41b forming a lip to receive the circular peripheral end of the outer shell body 40. The opposite end of the outer shell body 40 is provided with an inwardly inclined rim portion 40a which, in turn, is provided with a peripheral flange portion 40b to receive the opposite terminal end of the inner shell body 41.

The inner shell body 41 is preferably readily detachable from the outer shell body 40 to enable the units to be more easily cleaned from collected carbon and the like in a manner to be more fully described hereinafter. To separate the tubular member, the inner shell body 41 is merely pulled outwardly, thus freeing the perimetral flange portion 41b from one end of the outer shell body 40 and at the same time freeing the opposite terminal end of the inner shell body 41 from the flange portion 40b of the outer shell body 40. To assemble the inner shell body 41 to the outer shell body 40, the former is inserted in the pipe until its forward terminal end engages the flange portion 40b of the outer shell portion 40. Simultaneously when this occurs the flange portion 41b of the inner shell body 41 tightly engages the terminal end of the outer shell body 40, thus locking the bodies in air-tight relationship. While this is the preferred construction, it is to be understood that the inner and outer shell bodies 40 and 41 may be permanently secured to one another in spaced relationship.

The inner shell body 41 is provided with a plurality of angularly disposed baffle plates 41c, 41d, 41e, and 41f on the outside surface of the shell body, and are so positioned with relationship to the inlet openings 32a and the outlet openings 34 of the air-tight area between the inner and outer shell bodies 40 and 41 so as to provide a controlled, tortuous passageway for the smoke and heat to travel as it comes from the main body housing 11, thereby insuring a proper draft and more efficient burning as well as providing an excellent heat transfer relationship between the elements. The baffle plates 41c 41d, 41e and 41f have a height such that the outer edge of each baffle plate will form a substantial seal with the inner surface of the outer shell body 40 to insure the necessary controlled passageways for the smoke.

The baffle plates 41c and 41d are curved around the lower half of the inner shell body 41 and extend upwardly in inclined relationship around the shell body on either side thereof to a point short of the top surface leaving a passageway at the top of the shell body 41 at opposite ends thereof. The baffle plates 41c and 41d are inclined downwadly in the direction of one another adjacent opposite ends of the inner shell body 41, with the lower terminus of each baffle plate ending just above the inner inside edge of each of the outlet pipes 32a and extend around and upwardly therefrom in inclined relationship to force the smoke from each of the outlet pipes 32a upwardly and outwardly to the passageway formed at the top surface of the shell body 41 adjacent each end thereof.

The baffle plates 41e and 41f are curved around the upper half of the inner shell body 41 and are each spaced inwardly from the baffle plates 41c and 41d and are inclined such that they are in substantially parallel relationship with the baffle plates 41c and 41d. Each free end of of the baffle plates 41e and 41f terminates at a point about midway on each side of the inner shell body 41 with each end of the baffles being spaced below and in substantial alignment with the outside edge of the flue outlet opening 34, thereby forming a spaced vertical passageway for the smoke. The arrangement of the baffle plates 41c, 41d, 41e and 41f is such that the smoke passing upwardly from each of the outlet pipes 32a will be carried outwardly and upwardly on either side of the inner shell body 41 by means of the baffle plates 41c and 41d, and pass through the formed passageway of each top surface. The smoke will then strike the top surface of each of the baffle plates 41e and 41f and will be directed downwrdly and inwardly on either side of the inner shell body 41 until the smoke reaches the vertically formed passageway. The smoke will then pass upwardly through the flue outlet 34 in the outer shell body 40.

A blower fan 42 is positioned at one end of the transverse heat exchanger housing 32 for blowing air therethrough in transverse relationship to the path of the heat and smoke to pick up heat generated in heat exchange relationship for blowing same in a hot state into the area to be warmed. The diameter of the fan blade of the blower 42 is greater than the diameter of the outer shell body 40 and just slightly less than the inside diameter of the housing shield 33. This insures a blowing of air not only through the inner passageway of the inner shell body 41, but also around the outside surface of the outer shell body 40, thereby insuring excellent heat exchange relationship. If desired, a duct structure may be connected to the discharge end of the heat exchanger housing 32 for controlled discharge of the hot air. The blower 42 is centrally positioned and secured to a heavy metal screen 43 which in turn is tightly positioned at one end of the housing shield 33. The blower 42 is actuated by electric power, not shown, and is so timed as to be operable only during actual operation of the heating unit 10.

As hereinbefore indicated, the side cover members 17 and 17a form passageways, respectively, with the side wall members 14 and 15 through which air will be upwardly drawn. As hereinbefore indicated, the positioning of the inwardly flared lip portion on the top transverse edge of the shield member 17a is in close proximity to the blower 42 and above the top surface of the main body housing 11 with the shield member 17 having its top transverse edge slightly spaced below the top edge of the housing body 11. This construction results in a suction effect in each side passageway, thus drawing air upwardly on either side of the main housing body 11. The air thus drawn upwardly is heated in heat exchange relationship with the housing body 11 and is drawn into the blower air-stream, thereby increasing the heating efficiency of the unit. The air passing upwardly between the housing shield 17a and the side wall member 15 is blown completely around the heat exchange housing 32 by passing through the area existing between the heat exchanger housing 32 and the housing shield 33. The air being drawn upwardly between the side shield member 17 and the side wall member 14 passes upwardly and is drawn directly into the air-stream at the discharge end of the heat exchanger housing 32.

Air is also blown upwardly through the spaced passageway formed by the back cover member 13a and the back wall member 13 in the same way as the air is drawn upwardly along each of the side passageways formed on the sides of the unit 10. To facilitate the drawing upwardly of the air through the formed back passageway and to direct the efficient flow of air into the created blown air-stream to assist in providing the desired heat, a plurality of inclined baffle plates 13b are secured to the inside surfaces of the housing shield 33 in spaced relationship immediately adjacent the top surface of the main body housing 11. The baffle plates 13b are slighty wider than the width of the back passageway to insure the air being drawn into engagement with the baffle plates 13b. The baffle plates 13b are inclined in the direction of the air flow, thereby causing the air to be drawn upwardly into contact with the inclined surfaces and into the created air-stream. The positioning of the baffle plates 13b creates, in conjunction with the blower 42, an aspirating effect which materially aids in the efficiency of the unit 10.

To provide a constant heat source of facilitate the transfer of heat generated in the fire area of the main body housing 11 to the air-stream created by the blower 42, a removable heat trap member 45 is centrally positioned within the inner shell body 41 in spaced relationship thereto. The heat trap member 45 is in the form of an elongated tube 45a with each end thereof enclosed by a pointed nose portion 45b. Inlet means 45c and 45d are provided at spaced points on the under surface of the heat trap member 45 and in alignment with the inlet means 32a. This construction results in the formation of a closed circuit heat trap in which heat will be continually rising virtually directly from the fire area. Thus as air is blown through the transverse heat exchanger housing 32, the air will be continually heated by passage over the heat trap member 45.

The hot gases an air passing through the heat exchanger housing 32 in a tortuous path and hence up through the flue have a strong suction applied thereto by the draft inducer 35. The draft inducer 35, as hereinbefore indicated, is in the form of an exhaust blower and draws air up through the firebox area to insure a high degree of burning of material.

While the heat exchanger core 32 is a particular and preferred one, it is to be clearly understood that other heat exchanger means may be employed. For example, radiator type heat exchangers may be positioned over each of the flue outlets 32a, with each heat exchanger being provided with a blower. In this type of operation, the hot gases will pass up through each heat exchanger, transferring its heat thereto, with air being blown through the heat exchanger where it is warmed by the hot gases and then passed outwardly through the opposite end of the heat exchanger to provide the necessary heat.

In the operation of the present heater unit 10, if rubbish is to be burned, the heating unit will require no firebox but will merely have the grate 38 present therein with the openings 28 and 29 in the rear walls 13 and 13a being closed. The rubbish is then fed in through the feed door 23 and fired to burn same. The blower 42 is set into operation and the heat will be passed into the heat exchanger housing 32 and heat trap member 45 where it will continuously heat the air being blown therethrough in transverse relationship to the flow of the smoke and the heat from the fire burning area and out the discharge end of the housing 32 to heat the particular area desired. Upon completion of the burning of the refuse, and if heat is still needed, the firebox 39 is positioned on the grate 38 and the oil or gas burner 27 pushed through the openings 28 and 28a and fired to provide the necessary heat. The heat produced from the burning of the oil will then pass upwardly in the same manner as hereinbefore described and hot air is blown outwardly through the heat exchanger housing 32 to provide the desired heat. If oil or gas is not to be uesd to provide the necessary heat, the heating unit 10 may be continuously fed by coal or like material, with no firebox being needed. The adaptability of the heating unit 10 therefore will enable a user to continuously have heat to heat any given area as well as providing means to dispose of rubbish, and also upon completion of the burning of the rubbish, to readily convert to conventional fuel.

When heat is not required, the heating unit 10 may be used merely as an incinerator to burn refuse and the like. The unit is of a size and weight sufficient to enable it to be moved outside if too much heat is generated.

The advantage of the present invention as hereinbefore indicated is that with one form of the heat exchanger housing 32, cleaning thereof can be accomplished in a relatively short time. To clean the heat exchanger housing 32, the inner shell body 41 is merely pulled outwardly from the outer shell body 40. This operation results in the inclined baffle plates 41c, 41d, 41e and 41f scraping the inner surface of the outer shell body 40, thereby removing carbon and the like during the withdrawing operation. The inner shell body 41 is then cleaned by washing or the like with the inner surface of the shell body being likewise wiped clean. The inner shell body 40 is then inserted in the same manner as hereinbefore indicated.

While any suitable baffle plate construction may be employed to divide the baffle plates 41c, 41d, 41e and 41f, a particular and preferred construction consists of angled sheet metal in which the base thereof will be secured to the outer surface of the inner shell body 41. The vertical portion of the angled metal, which will function as the baffle plates, will be provided with a plurality of vertical slits such that when the sheet metal is curved to the contour of the inner shell body 41, the slit portion of the sheet metal will be expanded, resulting in a plurality of small, V-shaped notches. The advantage of this particular arrangement is that it will provide a plurality of small openings through which heat will seep to heat the opposite side thereof and will facilitate the passage of smoke and heat through the tortuous path hereinbefore defined. While this is a particular preferred construction, it is to be clearly understood that any suitable baffle plate construction may be employed which will result in the formation of the desired tortuous path.

No description has been given relative to electrical controls and the like for actuating the blower and draft inducer. However, such elements are conventional and may be provided at any suitable point on the unit.

While there have been described herein what are at present considered preferred embodiments of the invention, it will be obvious to those skilled in the art that modifications and changes may be made therein without deparing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. A heating apparatus comprising a casing including a top, a front, a back, and sides defining a fire burning area, means forming an opening in the front of said casing to provide access thereto, spaced external side cover means secured in spaced relation to either side of said casing and terminating substantially at the top of said casing thereof, spaced back external cover means secured in spaced relation to the back of said casing for passage of air upwardly therebetween, outlet means provided at the top of said casing and extending in vertical relationship thereto; elongated heat exchanger means secured to said outlet means in transverse relationship thereto, each end of said heat exchanger means being open, said heat exchanger means being above the top edge of each of said side cover means, said heat exchanger means including an outer casing and an inner casing spaced from one another, said inner and outer casings being sealed to one another at each end thereof thereby defining an enclosed area, said inner casing being in laterally detachable relationship with respect to said outer casing, the smoke from the fire burning area passing into said enclosed area, exhaust means secured to the top of said heat exchanger means in transverse relationship thereto for carrying off smoke, heat, and the like, draft inducing means connected to said exhaust means, blower means positioned at one end of said heat exchanger means to blow air therethrough in substantially transverse relationship to the passage of heat, and the like coming from said casing.

2. A heating apparatus comprising a casing including a top, a front, a back, and sides defining a fire burning area, means forming an opening in the front of said casing to provide access thereto, spaced external side cover means secured in spaced relation to either side of said casing and terminating substantially at the top of said casing thereof, spaced back external cover means secured in spaced relation to the back of said casing for passage of air upwardly therebetween, outlet means provided at the top of said casing and extending in vertical relationship thereto; elongated heat exchanger means secured to said outlet means in transverse relationship thereto, each end of said heat exchanger means being open, said heat exchanger means being above the top edge of each of said side cover means, said heat exchanger means including an outer casing and an inner casing spaced from one another, said inner and outer casings being sealed to one another at each end thereof thereby defining an enclosed area, said inner casing being in laterally detachable relationship with respect to said outer casing, the smoke from the fire burning area passing into said enclosed area, inclined baffle means secured to the outside surface of said inner casing to provide a tortuous path for the smoke, exhaust means secured to the top of said heat exchanger means in transverse relationship thereto for carrying off smoke, heat, and the like, draft inducing means connected to said exhaust means, blower means positioned at one end of said heat exchanger means to blow air therethrough in substantially transverse relationship to the passage of heat, and the like coming from said casing.

3. A heating apparatus comprising a casing including a top, a front, a back, and side defining a fire burning area, means forming an opening in the front of said casing to provide access thereto, spaced external side cover means secured in spaced relation to either side of said casing and terminating substantially at the top of said casing thereof, spaced back external cover means secured in spaced relation to the back of said casing for passage of air upwardly therebetween, outlet means provided at the top of said casing and extending in vertical relationship thereto; elongated heat exchanger means secured to said outlet means in transverse relationship thereto, each end of said heat exchanger means being open, said heat exchanger means being above the top edge of each of said side cover means, said heat exchanger means including an outer casing and an inner casing spaced from one another, said inner and outer casings being sealed to one another at each end thereof thereby defining an enclosed area, said inner casing being in laterally detachable relationship with respect to said outer casing, the smoke from the fire burning area passing into said enclosed area, inclined baffle means secured to the outside surface of said inner casing to provide a tortuous path for the smoke, elongated enclosed heat trap casing means centrally positioned within said inner casing in spaced relation thereto and having at least one opening therein to receive hot gases generated in said casing, exhaust means secured to the top of said heat exchanger means in transverse relationship thereto for carrying off smoke, heat, and the like, draft inducing means connected to said exhaust means, blower means positioned at one end of said heat exchanger means to blow air therethrough in substantially transverse relationship to the passage of heat, and the like coming from said casing.

4. A heating apparatus comprising a casing defining a fire burning area and including front, side, back, and top walls, means forming an opening in the front of said casing to provide access thereto, external side cover means secured in laterally spaced relation to each side wall of said casing with the top edge of each terminating substantially at the top wall of said casing thereof and defining a passageway on each side thereof for the passage of air upwardly therebetween, outlet means having an area in cross-section less than the area of said top wall secured to the top wall of said casing and extending above therefrom in vertical relationship thereto; elongated heat exchange means secured to the free end of said outlet means in transverse relationship thereto and in vertically spaced relation above said top wall, each end of said heat exchanger means being open, said heat exchanger means being above the top edge of each of said side cover means, exhaust means secured to the top of said heat exchanger means in transverse relationship thereto for carrying off smoke, heat, and the like, draft inducing means connected to said exhaust means, blower means positioned at one open end of said heat exchanger means to blow air therethrough in substantially transverse relationship to the passage of heat and the like coming from said casing.

5. A heating apparatus comprising a casing defining a fire burning area and including front, side, back, and top walls, means forming an opening in the front of said casing to provide access thereto, external side cover means secured in laterally spaced relation to each side wall of said casing with the top edge of each terminating substantially at the top wall of said casing thereof and defining a passageway on each side for the passage of air upwardly therebetween, back external cover means secured in laterally spaced relation to the back wall of said casing to form a passageway for passage of air upwardly therebetween, outlet means having an area in cross-section less than the area of said top wall secured to the top wall of said casing and extending above therefrom in vertical relationship thereto; elongated heat exchanger means secured to the free end of said outlet means in transverse relationship thereto and in vertically spaced relation above said top wall, each end of said heat exchanger means being open, said heat exchanger means being above the top edge of each of said side cover means, said heat exchanger means including an enclosed, longitudinally extending means defining a zone for receiving the smoke, exhaust means secured to the top of said heat exchanger means in transverse relationship thereto for carrying off smoke, heat, and the like, draft inducing means connected to said exhaust means, blower means positioned at one open end of said heat exchanger means to blow air therethrough in susbtantially transverse relationship to the passage of the heat and the like coming from said casing.

6. A heating apparatus comprising a casing defining a fire burning area and including front, side, back, and top walls, means forming an opening in the front of said casing to provide access thereto, external side cover means secured in laterally spaced relation to either side wall of said casing, with the top edge of each terminating substantially at the top wall of said casing thereof and defining a passageway on each side for the passage of air upwardly therebetween, back external cover means secured in laterally spaced relation to the back wall of said casing and defining a passageway for passage of air upwardly therebetween, outlet means having an area in cross-section less than the area of said top wall secured to the top wall of said casing and extending above therefrom in vertical relationship thereto; elongated heat exchanger means secured to the free end of said outlet means in transverse relationship thereto and in vertically spaced relation above said top wall, each end of said heat exchanger means being above the top edge of each of said side cover means, elongated, enclosed heat trap means centrally positioned within said heat exchanger means in laterally spaced relation thereto and having at least one opening therein to receive heat generated in the casing, exhaust means secured to the top of said heat exchanger means in transverse relationship thereto for carrying off smoke, heat, and the like, draft inducing means connected to said exhaust means, blower means positioned at one end of said heat exchanger means to blow air therethrough in substantially transverse relationhhip to the passage of heat and the like coming from said casing.

7. A heating apparatus comprising a casing defining a fire burning area and including front, side, back, and top walls, means forming an opening in the front of said casing to provide access thereto, external side cover means secured in laterally spaced relation to each side wall of said casing and with the top edge of each terminating substantially at the top wall of said casing thereof and defining a passageway on each side thereof for the passage of air upwardly therebetween, back external cover means secured in laterally spaced relation to the back wall of said casing defining a passageway for passage of air upwardly therebetween, outlet means having an area in cross-section less than the area of said top wall secured to the top wall of said casing and extending above therefrom in vertical relationship thereto; elongated heat exchanger means secured to the free end of said outlet means in transverse relationship thereto and in vertically spaced relation above said top wall, each end of said heat exchanger means being open, said heat exchanger means being above the top edge of each of said side cover means, said heat exchanger means including means defining a longitudinally-extending, enclosed zone for receiving smoke therein, baffle means positioned within said enclosed zone to provide a tortuous path for the smoke, exhaust means secured to the top of said heat exchanger means in transverse relationship thereto for carrying off smoke, heat, and the like, draft inducing means connected to said exhaust means, blower means positioned at one end of said heat exchanger means to blow air therethrough in substantially transverse relationship to the passage of heat and the like coming from said casing.

8. A heating apparatus comprising a casing defining a fire burning area including front, side, back, and top walls, means forming an opening in the front of said casing to provide access thereto, external side cover means secured in laterally spaced relation to each side wall of said casing, with the top edge of each terminating substantially at the top wall of said casing thereof and defining a passageway on each side thereof for the passage of air upwardly therebetween, back external cover means secured in laterally spaced relation to the back wall of said casing and defining a passageway for passage of air upwardly therebetween, outlet means having an area in cross-section less than the area of said top wall and secured to the top wall of said casing and extending above therefrom in vertical relationship thereto; elongated heat exchanger means secured to the free end of said outlet means in transverse relationship thereto and in vertically spaced relation above said top wall, each end of said heat exchanger means being open, said heat exchanger means being above the top edge of each said side cover means, said heat exchanger means including means defining a longitudinally-extending, enclosed zone for receiving smoke therein, baffle means positioned within the zone to provide a tortuous path for the smoke, elongated, enclosed heat trap casing means centrally positioned within said heat exchanger means in spaced relation thereto and having at least one opening therein to receive heat in said casing means, draft inducing means connected to said exhaust means, blower means positioned at one end of said heat exchanger means to blow air therethrough in substantially transverse relationship to the passage of heat and the like coming from said casing.

9. A heating apparatus comprising a casing including a top, a front, a back, and sides defining a fire burning area, means forming an opening in the front of said casing to provide access thereto, spaced external side cover means secured to the sides of said casing and terminating substantially at the top of said casing thereof to form passages for passage of air upwardly therethrough, spaced external back cover means secured to the back of said casing in spaced relationship therewith to form a passage for passage of air upwardly therethrough, outlet means provided at the top of said casing, elongated heat exchange means secured to said outlet means in transverse relationship with each end of said heat exchange means being open, said heat exchange means being positioned above the top edge of said side cover means, a plurality of baffle means positioned in inclined, longitudinally spaced relationship above the passageway on the back of said casing and substantially at the bottom of said heat exchanger means to form an aspirator means to enable air to be drawn upwardly through said back passageway and outwardly through said heat exchanger means, exhaust means secured to the top of said heat exchanger means for carrying off smoke, heat, and the like, draft inducing means connected to said exhaust means, blower means positioned at one end of said heat exchanger means to blow air therethrough in substantially transverse relationship to the passage of heat, smoke, and the like coming from said casing and to render operable said aspirator means.

10. A heating apparatus in accordance with claim 9 in which elongated shield means are secured at the top of said back cover means and extending above and covering said elongated heat exchanger means in spaced relationship, and defining an air passageway therebetween.

11. A heating apparatus in accordance with claim 9 wherein the heat exchanger means include an outer casing and an inner casing spaced from one another, said inner and outer casings being sealed to one another at each end thereof thereby defining an enclosed area, said inner casing being in laterally detachable relationship with respect to the outer casing with the smoke from the fire burning area passing into the enclosed area.

12. A heating apparatus in accordance with claim 11 wherein an elongated enclosed heat trap casing means is centrally positioned within said inner casing in spaced relation thereto and provided with at least one opening to receiver gases generated in the fire burning area.

13. A heating apparatus comprising a casing including a top, a front, a back, and sides defining a fire burning area, means forming an opening in the front of said casing to provide access thereto, spaced external side cover means secured in spaced relation to either side of said casing and terminating substantially at the top of said casing thereof to form passages for passage of air upwardly therethrough, spaced back external cover means secured in spaced relation to the back of said casing for passage of air upwardly therethrough, outlet means provided at the top of said casing and extending in vertical relationship thereto, elongated heat exchanger means secured to said outlet means in transverse relationship thereto, each end of said heat exchanger means being open, said heat exchanger means being above the top edge of each of said side cover means, elongated shield means extending upwardly from said back cover means and covering said elongated heat exchanger means axially in spaced relationship and defining an air passageway therebetween and a plurality of baffle means positioned in inclined, longitudinally spaced relationship above the passageway on the back of said casing and spanning the distance between said casing and said back cover means immediately adjacent the top edge of said casing and at the bottom of said heat exchanger means to form an aspirator means to enable air to be drawn upwardly and outwardly through said back passageway, exhaust means secured to the top of said heat exchanger means in transverse relationship thereto for carrying off smoke, heat, and the like, draft inducing means connected to said exhaust means, blower means of a width just less than the width of said shield means positioned at one end of said heat exchanger means to blow air therethrough in substantially transverse relationship to the passage of heat and the like coming from said casing, and to render operable said aspirator means.

References Cited in the file of this patent

UNITED STATES PATENTS

| | | |
|---|---|---|
| 1,026,777 | Swett | May 21, 1912 |
| 1,577,674 | Anderson | Mar. 23, 1926 |
| 1,871,322 | Hodgins | Aug. 9, 1932 |
| 1,968,581 | Williams | July 31, 1934 |
| 2,125,020 | Haynes | July 26, 1938 |
| 2,192,636 | Briggs | Mar. 5, 1940 |
| 2,283,407 | Bassett et al. | May 19, 1942 |
| 2,333,317 | Kritzer | Nov. 2, 1943 |
| 2,348,127 | Grimes | May 2, 1944 |
| 2,775,238 | Clark et al. | Dec. 25, 1956 |